(12) United States Patent
Goel et al.

(10) Patent No.: US 7,630,409 B2
(45) Date of Patent: Dec. 8, 2009

(54) METHOD AND APPARATUS FOR IMPROVED PLAY-OUT PACKET CONTROL ALGORITHM

(75) Inventors: Nagendra Goel, McLean, VA (US); Ran Katzur, N Potomac, MD (US)

(73) Assignee: LSI Corporation, Milpitas, CA (US)

( * ) Notice: Subject to any disclaimer, the term of this patent is extended or adjusted under 35 U.S.C. 154(b) by 997 days.

(21) Appl. No.: 10/277,238

(22) Filed: Oct. 21, 2002

(65) Prior Publication Data

US 2004/0076190 A1 Apr. 22, 2004

(51) Int. Cl.
*H04J 3/06* (2006.01)
(52) U.S. Cl. .................................... 370/516; 370/252
(58) Field of Classification Search ............... 370/412, 370/468, 512, 389, 229–235, 235.1, 252, 370/428, 505, 506, 519, 516, 253
See application file for complete search history.

(56) References Cited

U.S. PATENT DOCUMENTS

| 5,689,615 | A | * | 11/1997 | Benyassine et al. ......... 704/219 |
|---|---|---|---|---|
| 5,699,481 | A | * | 12/1997 | Shlomot et al. ............. 704/228 |
| 5,790,538 | A | * | 8/1998 | Sugar .......................... 370/352 |
| 6,452,950 | B1 | * | 9/2002 | Ohlsson et al. ............. 370/516 |
| 7,006,510 | B2 | * | 2/2006 | Wei ............................. 370/412 |
| 7,170,901 | B1 | * | 1/2007 | Katzur ........................ 370/412 |
| 2004/0204935 | A1 | * | 10/2004 | Anandakumar et al. ..... 704/230 |

FOREIGN PATENT DOCUMENTS

EP 743773 A2 * 11/1996

* cited by examiner

*Primary Examiner*—Brenda Pham
(74) *Attorney, Agent, or Firm*—Trexler, Bushnell, Giangiorgi, Blackstone & Marr, Ltd.

(57) ABSTRACT

A method and apparatus which provides that, in a voice over network, incoming packets are analyzed and the appropriate moment to increase or decrease the nominal delay associated with a jitter buffer is determined. Hence, the nominal delay is adjusted at an appropriate moment based on network jitter characteristics. Preferably, the nominal delay is adjusted when voice activity is absent. The method and apparatus provide for improved play out of the jitter buffer, and provide improved performance.

8 Claims, 3 Drawing Sheets

METHOD AND APPARATUS FOR IMPROVED PLAY-OUT PACKET CONTROL ALGORITHM

BACKGROUND

The present invention generally relates to voice communication over packet networks, and more specifically relates to a method and apparatus for improving voice quality in voice-over-packet networks.

A typical architecture of a voice-over packet system (focusing only on the voice communication part) is illustrated in FIG. 1. The voice encoders/decoders 10 and 12 shown in FIG. 1 are the most commonly used as per present ITU/T recommendations. However, such details may change over time, and are given in FIG. 1 for illustration purposes only. Many sources are readily available which provide a detailed description of the various components of a voice-over packet system.

Due to the inherent nature of packet-based data communication networks, although the voice-over-packet communication device sends packets to the other end at equal time intervals, when the packets are received from the network, they do not arrive at equal time intervals. Several phenomena cause the packet on the receive side to not to arrive in a regular time. The network behavior can change the time interval between two packets that arrive at the receive side. The difference in time of arrival of packets due to the network instantaneous load and behavior is called "jitter." Sometimes, depending on the network protocol used, and the network conditions, the packets may even arrive in a sequence that is different from the sequence in which they were sent.

Another phenomenon that effects packet arrival is the clock differences between the transmit side clock and the receive side clock. This difference may result in too many packets or too few packets received by the receive side. Thus a clock recovery mechanism is needed to resynchronize the transmit side with the receive side. This patent offers an improvement in solving the jitter problem and the clock recovery problem.

Sophisticated Voice Over Network system use Voice activation detection to detect when no voice information is sent out, and cartel sending packets if only the background noise exists. However, most system alert the receive side that a period of no packets comes by sending a special information packet, SID (Silence Indicator) that convey the transmit background noise characteristics to the receive side.

Jitter Problem: As shown in FIG. 1, a voice-over packet system typically includes a network jitter compensator or jitter buffer 14. The network jitter compensator 14 temporarily holds the packets received from the network, and, if necessary, makes sure that they are in sequence. A typical architecture of a jitter compensator is shown in FIG. 2.

Although the long-term average packet arrival rate from a network is generally constant, over short periods of time, packets typically arrive from the network at random intervals. These packets are placed in a play out queue 16 as shown in FIG. 2, and are scheduled to be decoded and played out after a pre-determined amount of delay. For example, the packets may be scheduled for a play-out after a delay of exactly M packet periods. Once the play-out begins, every in-sequence packet is played out consecutively after the current packet. If this "nominal delay" parameter is set to a very short interval, it is possible that a packet will arrive very late from the network, and the voice decoder run out of packets. In that case, even if the packet arrives later, it is still effectively lost, because the window of opportunity for play-out has been lost. Such a situation may cause annoying distortions and degradation of the voice quality. However, if the play-out queue introduces too much delay, that would introduce a corresponding delay in the voice-Playout that may be perceptible and annoying to the human audience of the voice conversation.

Since network conditions may change over time, the typical objective of a jitter buffer algorithm is to constantly monitor the network conditions, and to adjust the "nominal-delay" to a minimum possible value, while ensuring that the packet loss due to network jitter is kept to a minimum. The algorithm that monitors the network characteristics, adjusts the nominal delay from time to time.

When the nominal delay is adjusted, the nominal delay may either be increased or reduced from its previous value. If the nominal delay is to be increased from its previous value, a "lost" packet is introduced in the packet stream that is received by the voice decoder (see FIG. 1). As a result, the voice decoder either plays silence for that short period, or attempts to hide the effect of packet loss by artificially generating some voice samples. If the nominal delay is to be reduced, typically more than one packet in the play-out queue is played out at the same time, and one of these packets is discarded, thus causing a discontinuity in the voice play-out.

Therefore, every time the "nominal-delay" of the jitter-buffer is modified, a discontinuity is introduced into the voice waveform, thereby degrading the voice quality. Another disadvantage of prior art implementations is that, since adaptation to "nominal delay" causes a degradation in the voice quality, the adaptation algorithms that are presently being used are very conservative. These algorithms tend to assign nominal-delays that are longer, and change their values less frequently, thereby increasing the overall system voice delay.

Clock recovery Problem: FIG. 3 illustrates a typical voice over network model, wherein a telephone 20 in system A establishes a link with a telephone 22 in system B, via a network. The standard sampling rate of telephony systems is 8000 samples per second. Each end of the link samples analog signal to digital and converts digital signals to analog 8000 times per second measured by its local crystal. However, these crystals might vary and the clock (that is derived from the crystal) in system A is different from the clock of system B. For example, if the difference between the two clocks is 125 ppm (parts per million) such that the clock in system A is faster than the clock in system B, every 8000 times that system A samples the analog signal, system B samples only 7999 times its analog signal. (125:1000000=1:8000). Hence, every second, system A must play 8000 digital samples toward the analog TELCO, but receives only 7999 samples. Thus, after a long time, the receive buffer of system A will be empty. In other words, there is under-flow.

System B experiences a similar, but opposite, phenomenon. Every second, as it is measured by the local clock of system B, 8001 samples will arrive from system A, but only 8000 samples will be sampled into an analog signal toward its TELCO. Thus, after a long time, the receive buffer of system B will be full. In other words, there is overflow.

Ignoring any other impairments between system A and system B, and assuming ideal processing, the clock difference between the two systems will cause a slight, but not audible, frequency shift. Sensitive frequency applications, such as a high bit rate data modem, might experience degradation in the link quality due to the frequency shift. However, the discontinuity that is associated with inserting additional samples when the receive buffer is empty, or deleting a sample when the receive buffer is full, causes degradation of the channel if the insertion of the additional sample or the elimination of the extra sample is not performed properly. The present invention presents a simple method to overcome the discontinuity that is associated with the clock differences. This family of algorithms is often referred to as "Clock Recovery" algorithms.

Observation of the jitter buffer behavior for a long time can distinguish between two phenomena—the delay jitter due to network impairments and a change in the number of frames in the jitter buffer due to clock differences. Network delay jitter causes the number of frames or samples in the jitter buffer to vary with time, but the long term averaging of the number of the frames in the jitter buffer will stay constant. A difference in clock rate, on the other hand, changes the long-term average of the number of samples in the jitter buffer. The jitter buffer of the slower system will increase the average number of frames in the jitter buffer as time progress, while the faster system's jitter buffer will decrease the number of frames.

Objects and Summary

A general object of an embodiment of the present invention is to provide a method, which improves the play-out of a jitter buffer.

Another object of an embodiment of the present invention is to analyze incoming packets and adjust the nominal delay associated with a jitter buffer at an appropriate time.

Still another object of an embodiment of the present invention is to improve upon the performance of a jitter buffer operation by adding an additional stage to a jitter buffer algorithm that determines the appropriate moment to increase or decrease the nominal delay associated with the jitter buffer.

Briefly, and in accordance with at least one of the foregoing objects, an embodiment of the present invention provides a method and apparatus which provides that, in a voice over network, incoming packets are analyzed and the appropriate moment to increase or decrease the nominal delay associated with a jitter buffer is determined. Hence, the nominal delay is adjusted at an appropriate moment based on network jitter characteristics. Preferably, the nominal delay is adjusted when voice activity is absent. The method and apparatus provide for improved play out of the jitter buffer, and provide improved performance.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DESCRIPTION

Figure 1:
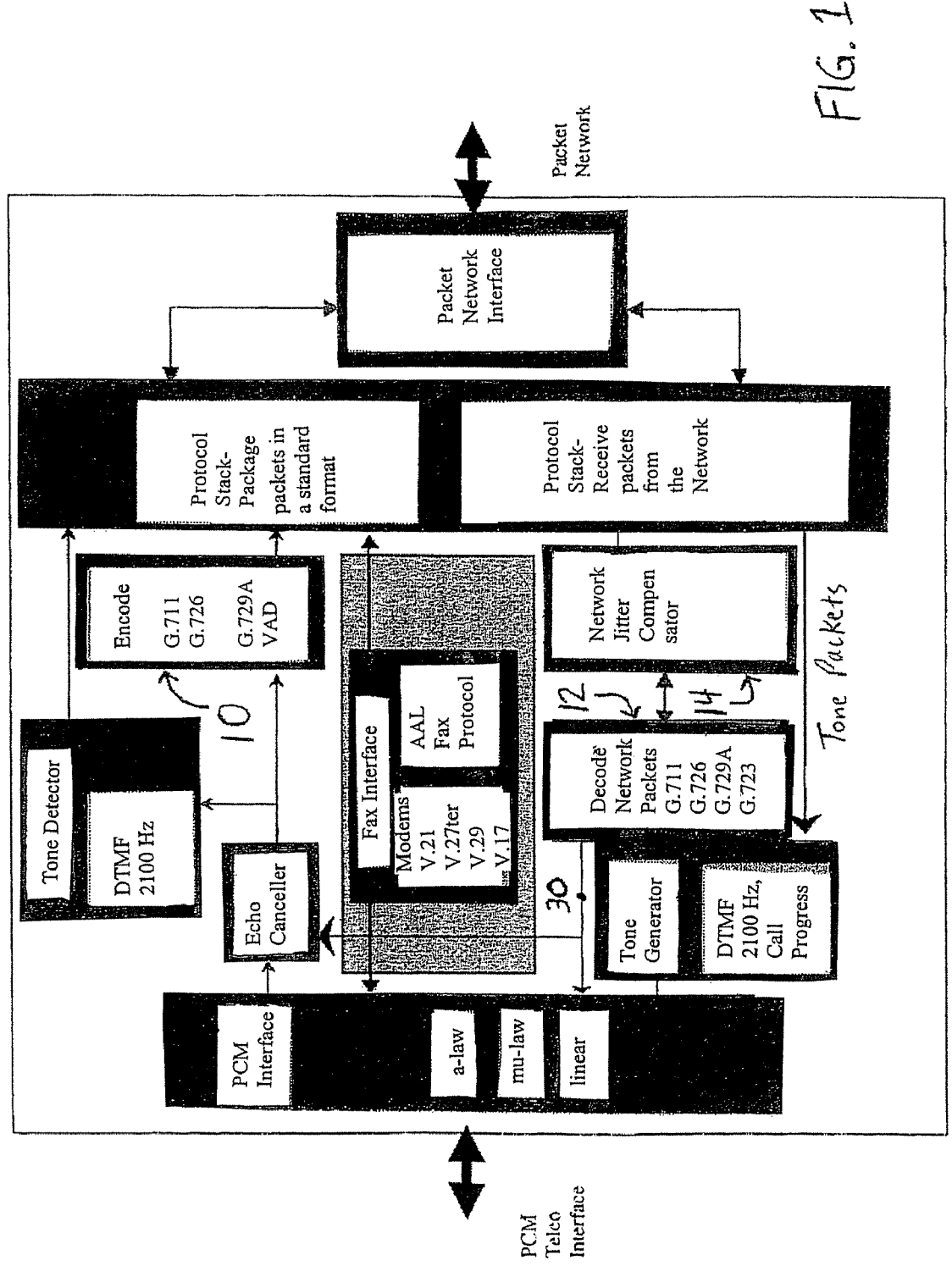
FIG. 1 is a block diagram, which illustrates a typical architecture of a voice-over-packet system, focusing on the voice communication part of the system.
Figure 2:
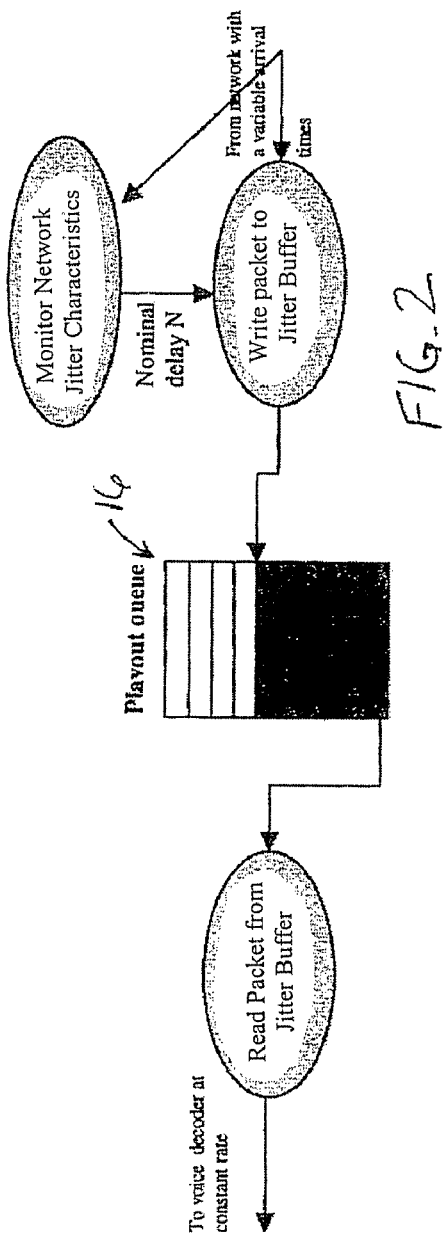
FIG. 2 is a block diagram that illustrates the basic principle of jitter buffer operation.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Figure 3:
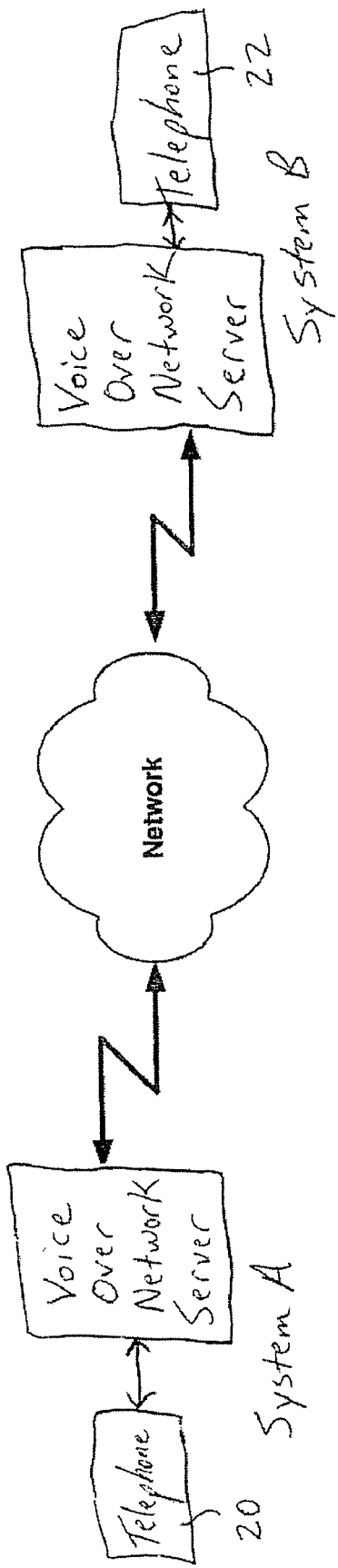
FIG. 3 is a diagram which illustrates a typical voice over network model.
Figure 4:
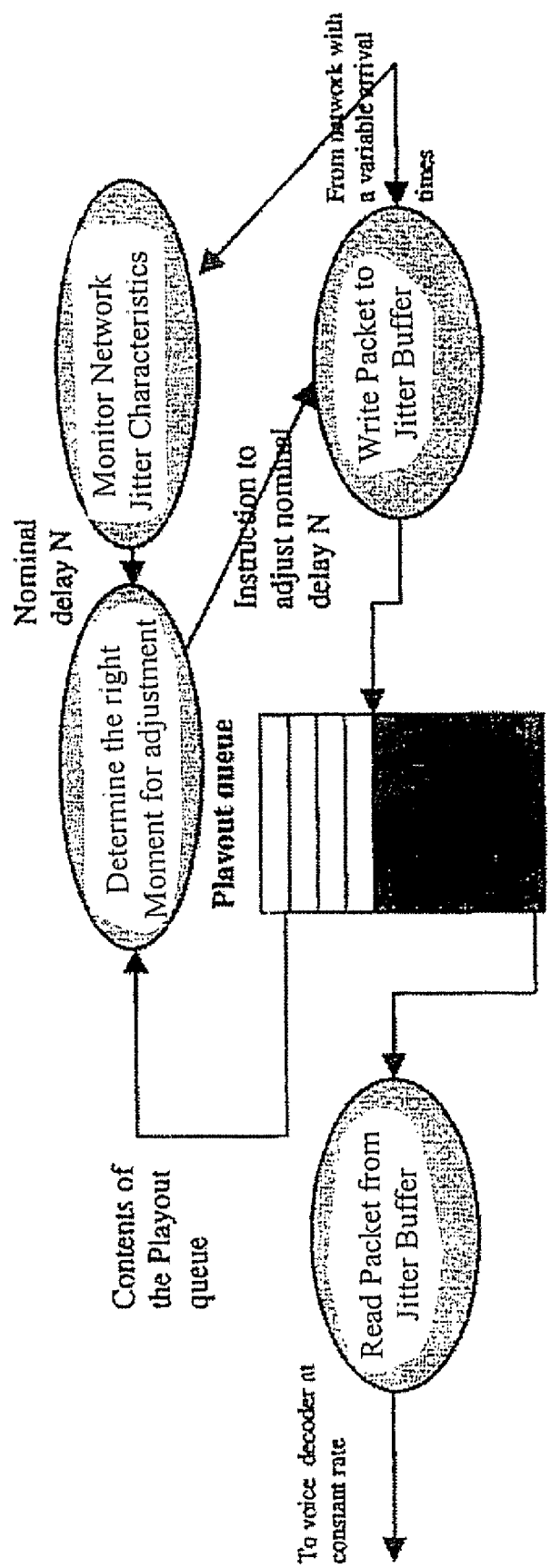
FIG. 4 is a diagram that illustrates improved jitter buffer operation in accordance with an embodiment of the present invention.

FIG. 4 illustrates improved jitter buffer operation in accordance with an embodiment of the present invention. Specifically, network jitter characteristics are monitored, and the right moment for adjusting a nominal delay associated with the jitter buffer is determined. Then, the nominal delay is adjusted. As a result, the jitter buffer operates more effectively in the network (see FIGS. 1 and 3).

As such, the invention improves upon the performance of jitter buffer operation by adding an additional stage to the jitter buffer algorithm that determines the appropriate moment to increase or decrease the "nominal delay." By using the term nominal delay, it is implied that the jitter buffer maintains a local clock, that is tied to the local TDM (Time division Multiplex) T1/E1 clock or the 8 KHz standard telephony A/D (Analog to Digital) converter clock. When a packet arrives, its original transmission time from the source is estimated (either from the timestamp on the packet or the sequence of arrival), and the nominal delay is measured from that instant.

The modified algorithm is as shown in FIG. 4. The decision to adjust the nominal delay is not implemented immediately. Instead, the contents of the Playout queue are analyzed, and an appropriate moment is selected to implement the change in the "nominal delay." The most appropriate moment is when the voice activity is absent. Such a situation is determined as follows:

Telephony systems that use Voice Activity Detection (VAD) stops sending voice information packets when there is no voice activity and only the background noise exists. Some ITU-T standard CELP codec such as G.729B, G.723.1 have optional internal VAD mechanism that detects the activity and non-activity of voice in the channel, and sends a well define SID (silence indicator) message that contains background noise information. Systems that do not use internal codec VAD can employ an external VAD module that detects voice activity and send a standard SID message to the other side. Some systems use external VAD but do not send SID message to the receive side. In any of these cases, of systems with VAD mechanism, when there is a period of in-activity of the voice in one end of the link, the jitter buffer of the other side will be empty because the sending side does not send any packet. This is not true for systems that do not employ VAD mechanism.

For systems with VAD, the modification to the nominal delay is implemented after a SID frame has occurred. Similarly, for systems that use VAD but do not send SID message, the modifications to the nominal delay will be done when the jitter buffer is empty for a long enough period of time. The jitter buffer will be empty for a long time only if the sending side stops sending packets.

Under some situations, the equipment at the other end may not transmit SID frames, but send voice frames continuously. This may be due to some continuous ongoing background noise, or because the compression algorithm at the other end does not have a Voice Activity Detector. In such a case, the output stream at the decoder output will be monitored (point 30 in FIG. 1), and periods of low energy would be detected. One of the possible ways to detect periods of low energy (silence) is as follows:

Compute signal energy for each frame by summing the square of each voice sample in that frame. Keep track of the energy values of the last N frames by implementing a circular buffer of energy values. At every time step, choose the energy threshold such as M % of the frames have energy below that threshold. The values N and M can be changed depending on the processor resources available, and the targeted application scenario. For example, N could be 500 and M could be 30. These values can also vary with time, if it is desired to have a certain minimum or maximum number of "nominal delay" modification opportunities, in a given period of time. Then, find a location where at least two consecutive frames are below the threshold. The second frame in such a sequence of two frames would constitute the appropriate moment when the value of the nominal delay is modified by inserting or removing an extra packet. Note that the system might insert or eliminate more than one frame if a period of low energy is detected very rarely.

Next we describe how the same technique of changing nominal delay in a certain instances can solve the clock recovery problem as well. Preferably, a frame-based clock recovery algorithm is utilized in the following manner: While fast systems periodically insert additional frames, slow systems periodically eliminate some frames. Preferably, the algorithm is divided into three parts:

1. Estimate the clock difference between the local clock and the clock at the other end-point.
2. Determine how often an additional frame needs to be inserted or a frame needs to be eliminated.
3. Determine the right time and algorithm to create an additional frame or eliminate an extra frame.

With regard to estimating the clock difference and determining how often an additional frame needs to be inserted or a frame needs to be eliminated, the method will be different depending on the network protocol. It is common to distinguish between two types of voice over network protocol. The method of how to estimate the clock differences will be different for protocols that carry local time with the payload frame information such as voice over IP protocol than for protocols that do not carry time value with payload frames such as voice over ATM.

For protocols that carry time information with payload frame, preferably the algorithm is configured to assess the time difference in the following manner: Let K1 be a frame that is played-out at local time t1. The algorithm saves the original time information, denoted by T1, which is carried by the protocol with the K1 frame. Let K2 be another frame that is played some time later, (K2 occurs after K1), and let t2 be the local time when K2 is played-out and T2 is the correspondent original time information. Let dt=t2−t1, and dT=T2−T1. If dt<dT, the local clock is slower than the far-end clock, and a single packet must be eliminated on the average every N frames:

$$N=dT/(dT-dt). \tag{1}$$

If dt>dT, the local clock is faster than the far-end clock, and a single packet must be added on the average every N frames:

$$N=dt/(dt-dT). \tag{2}$$

For protocols that do not carry time information with payload frame, dt and dT are built piecewise during multiple voice bursts in the following fashion. During a voice burst, the average number of voice packets in the jitter buffer is calculated. If the clocks at the two endpoints of the link are identical, the average number of frames in the jitter buffer is equal to the nominal number of frames. If the local clock is faster than the far-end clock, the average number of frames in the jitter buffer will decrease during voice burst. If the local clock is slower than the far-end clock, the average number of frames in the jitter buffer will increase. Let K be the total number of frames that were played-out during a voice burst, including lost frames. Let voice frame time be T, and D be the average number of frames in the jitter buffer. At the beginning of the burst, the jitter buffer has exactly nominal delay frames. If D is larger than the nominal delay, then the local clock is slower than the far-end clock and a frame must be eliminated on the average every $$N=K*T/(2*(D-\text{Nominal\_delay}))\text{frames}. \tag{3}$$

If D is smaller than the nominal delay, the local clock is faster than the far-end clock and an additional frame must be added on the average every $$N=K*T/(2*(\text{Nominal\_delay}-D))\text{frames}. \tag{4}$$

With regard to determining what is the tight time and what will be the algorithm to create an additional frame or eliminating extra frame, a typical crystal has a frequency stability that is better than 50 ppm, thus the difference between two systems is less than 100 ppm. If the frame size is 5 milliseconds, every 10000 frames or 50 seconds, one endpoint of the link has to add a single frame, and the other endpoint must eliminate a frame. For systems that employ a VAD algorithm, the process of adding a frame or eliminating a frame is done automatically when the jitter buffer adjusts the nominal delay. Preferably, the algorithm is configured such that it does the following:

If the local system clock is slower than the system at the other endpoint, the local system will display a tendency to reduce the nominal delay over a long period of time as it would be receiving more packets than it expects. If the local system clock were faster than the other endpoint system, then the nominal delay would have a tendency to continuously increase over a long period of time. Therefore we shall impose a minimum and a maximum threshold to the nominal delay. If the nominal delay exceeds the maximum threshold, the nominal delay would be re-adjusted the average of the maximum and the minimum threshold. A period of silence would still be inserted at the appropriate moment, as required every time the nominal delay is increased. If the nominal delay falls below the minimum threshold, delay would be re-adjusted the average of the maximum and the minimum threshold, and a packet would still be not played out at the appropriate moment as required every time the nominal delay is reduced. The instant when the "nominal delay" is re-centered is recorded, and the period between such events is used to predict such events in the future and to correct for those.

The present invention provides that incoming packets are analyzed and the appropriate moment to increase or decrease the nominal delay associated with the jitter buffer is determined, and the nominal delay is modified. This provides for improved play out of a jitter buffer.

While embodiments of the present invention are shown and described, it is envisioned that those skilled in the art may devise various modifications of the present invention without departing from the spirit and scope of the appended claims.

What is claimed is:

1. A method of operating a jitter buffer having a playout queue, said method comprising: analyzing contents of the playout queue in order to determine an appropriate point in time to adjust a nominal delay associated with when packets are played out of the playout queue, wherein the contents which are analyzed comprise packets which are still sitting in the playout queue and have not been played out of the playout queue yet; and adjusting the nominal delay at the appropriate point in time such that a speed at which packets are played out of the playout queue changes, wherein the appropriate point in time comprises:

when the playout queue has been empty for a predetermined period of time, further comprising keeping track of the energy values of a last pre-determined number of frames by implementing a circular buffer of energy values.

2. A method as recited in claim 1, further comprising increasing or decreasing the nominal delay, wherein packets are played out of the playout queue faster when said nominal delay is decreased and are played out of the playout queue slower when said nominal delay is increased.

3. A method as recited in claim 1, wherein the step of detecting periods of low energy composes computing signal energy for each frame by summing the square of each voice sample in that frame.

4. A method as recited in claim 1, further comprising choosing an energy threshold at every time step.

5. A method as recited in claim 4, further comprising finding an occurrence where at least two consecutive time frames are below the threshold.

6. A method as recited in claim 5, further comprising adjusting the second delay when the second time frame of said at least two consecutive time frames occur.

7. A method as recited in claim 1, further comprising having the jitter buffer provide packets to a decoder, and monitoring an output of the decoder and detecting periods of low energy.

8. A method of operating a jitter buffer having a playout queue, said method comprising: analyzing contents of the playout queue in order to determine an appropriate point in time to adjust a nominal delay associated with when packets are played out of the playout queue, wherein the contents which are analyzed comprise packets which are still sitting in the playout queue and have not been played out of the playout queue yet; and adjusting the nominal delay at the appropriate point in time such that a speed at which packets are played out of the playout queue changes, wherein the appropriate point in time comprises:

when the playout queue has been empty for a predetermined period of time, further comprising having the jitter buffer provide packets to a decoder, and monitoring an output of the decoder and detecting the periods of low energy.

* * * * *